Fig. 10

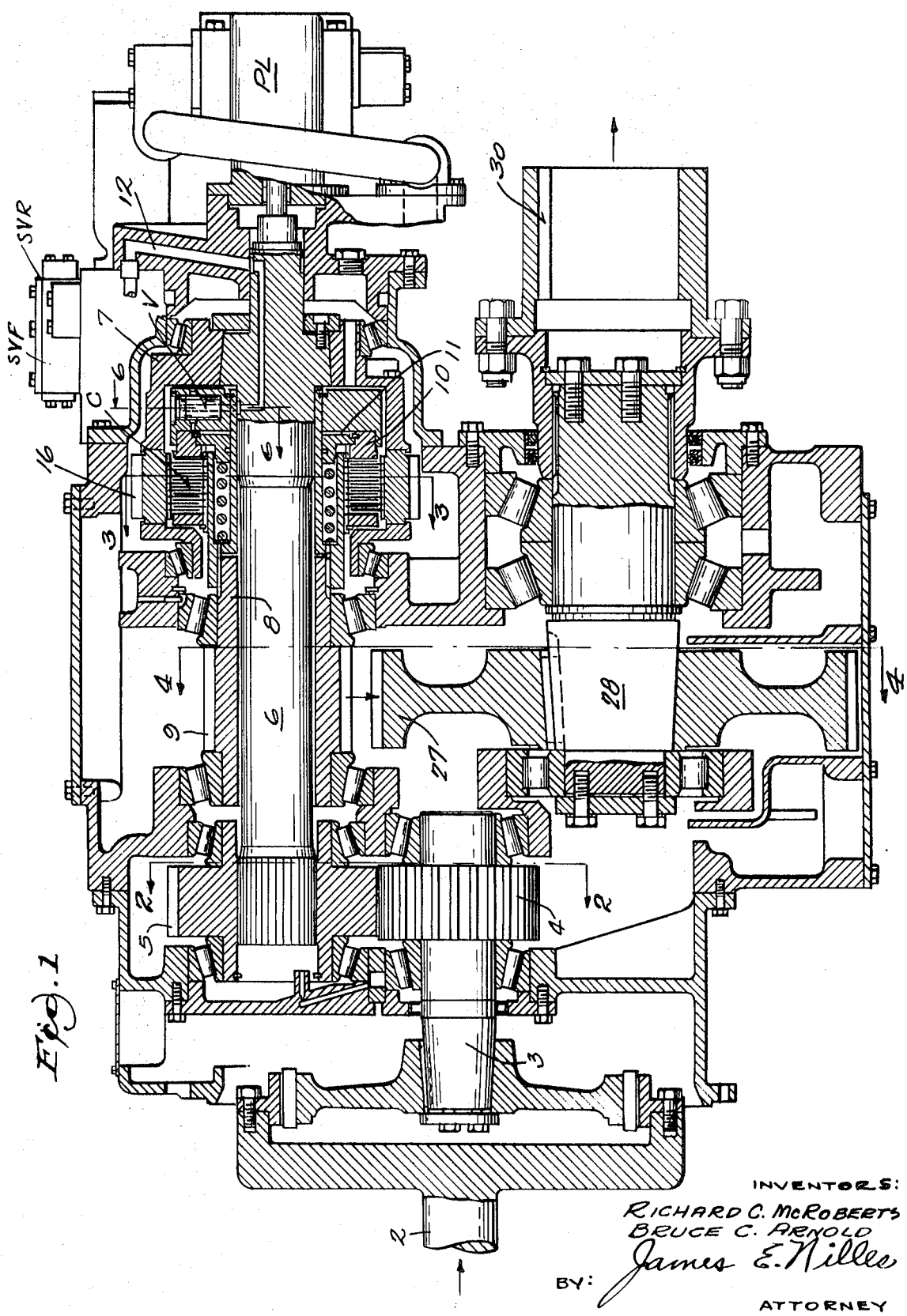

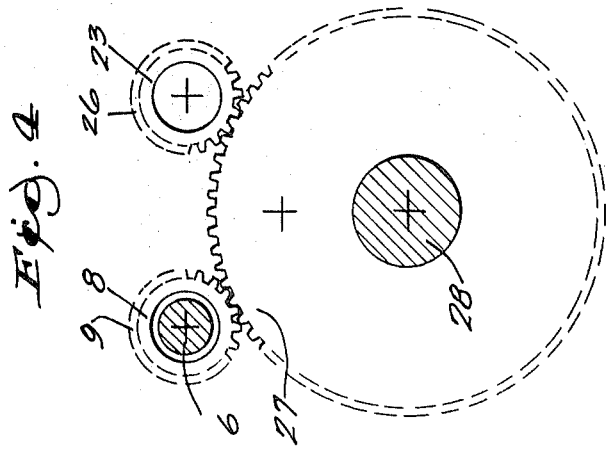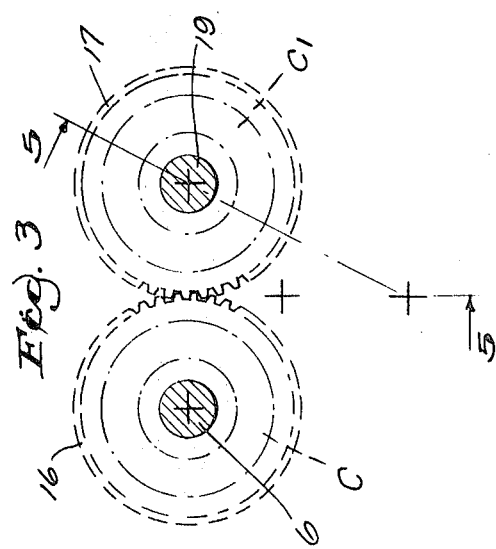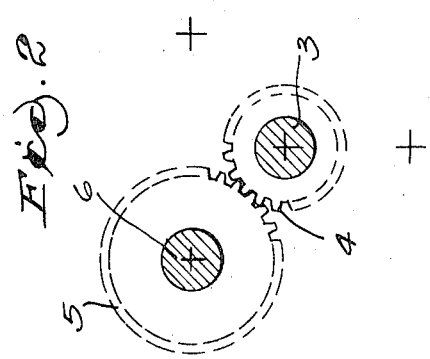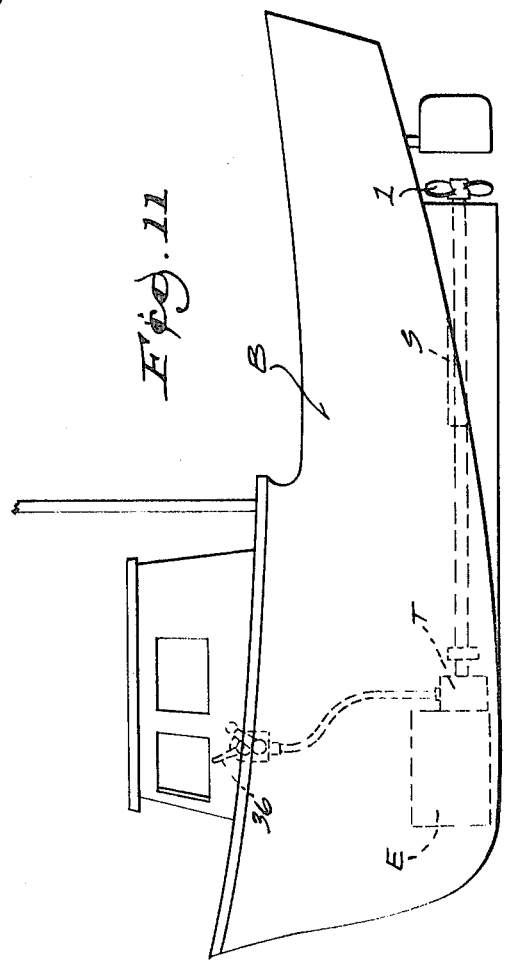

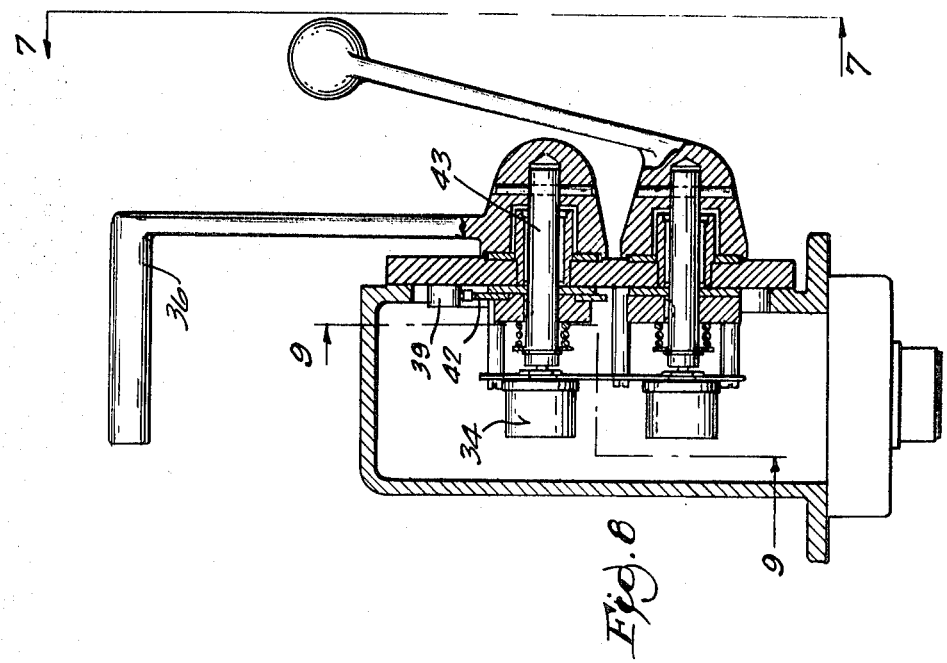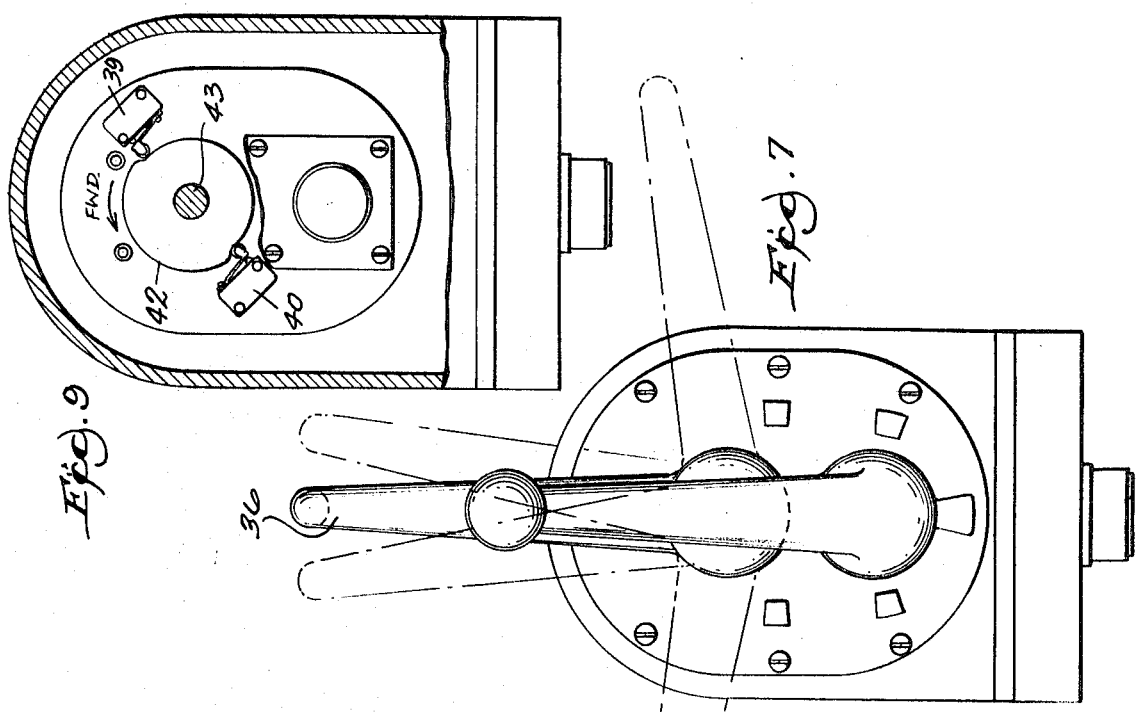

INVENTORS:
RICHARD C. McROBERTS
BRUCE C. ARNOLD
BY: James E. Nilles
ATTORNEY

United States Patent Office 3,613,469
Patented Oct. 19, 1971

3,613,469
POWER TRANSMISSION OF THE HYDRAU-
LICALLY ACTUATED, FRICTION CLUTCH
TYPE
Richard C. McRoberts and Bruce C. Arnold, Racine,
Wis., assignors to Twin Disc, Incorporated, Racine,
Wis.
Filed Apr. 29, 1970, Ser. No. 32,914
Int. Cl. F16h 3/08, 3/14
U.S. Cl. 74—361
15 Claims

ABSTRACT OF THE DISCLOSURE

A power transmission including forward and reverse shafts each having a hydraulically actuated clutch which is controlled by a centrifugal valve. The transmission finds particular utility in regulating the speed, rotational direction, and power delivered to the propulsion drive in a marine vessel.

BACKGROUND OF THE INVENTION

The invention pertains to power transmission of the type having both forward and reverse power shafts, and each shaft having a hydraulically actuated, selectively engaged, clutch.

The type of hydraulically operated valve means useable with the present invention is shown in the U.S. Pat. 3,352,395, issued Nov. 14, 1967, and entitled "Friction Clutch Having Centrifugally Operated Valve Means," which patent has been assigned to an assignee common with the present invention.

Heretofore, in attempting to control the magnitude and direction of propeller thrust in a marine vessel, it has been common practice to provide a variable pitch propeller which can control propeller thrust somewhat independently of prime mover r.p.m. However, these prior art transmissions had several shortcomings, among which was the inability to maintain the engine speed sufficiently high under certain operating conditions.

SUMMARY OF THE PRESENT INVENTION

The present invention provides a power transmission having forward and reverse shafts, each of which are controlled by a modulatable and hydraulically operated friction clutch, which clutches are in turn controlled by a centrifugal valve which regulates the amount of fluid being admitted to the actuating chamber of the clutch to supply both the piston leakage from the torque transmitting clutch as well as the design orificed flow from this clutch. By balancing the fluid admitted with the control of exhaust fluid, the clutch may be operated at and will automatically maintain, any required degree of clutch slip to maintain a near constant output r.p.m. regardless of increases or decreases in clutch torque loading. The transmission provided by the present invention has the ability to control the speed of the output shaft such as a propeller shaft of a marine vessel, and this control is independent of the speed of the engine. When used in such a marine installation, it is unnecessary to provide a variable pitch propeller and many of the functions of a variable pitch propeller can nevertheless be obtained. The arrangement is such that the engine speed can be maintained at a fixed r.p.m. and at the same time, variable thrust can be provided for the vessel by changing the speed of the output, propeller shaft.

These and other objects and advantages of the present invention will appear hereinafter as this disclosure progresses, reference being made to the accompanying drawings.

BRIEF DESCRIPTION OF THE DRAWINGS

FIG. 1 is a longitudinal, cross sectional view through the transmission made in accordance with the present invention, and particularly showing the forward drive shaft;

FIG. 2 is a transverse, cross sectional view taken generally along the line 2—2 in FIG. 1 and showing the arrangement of the gears for transmitting power from the input to the forward shaft;

FIG. 3 is a transverse, cross sectional view taken generally along line 3—3 in FIG. 1 and showing the constant mesh gear portions of the two hydraulically actuated clutches;

FIG. 4 is a transverse, cross sectional view showing the arrangement between the pinion gears on the forward and reverse shafts and the large output gear with which they mesh;

FIG. 7 is a side elevational view of the manual control apparatus for the present invention, the view being taken generally along line 7—7 in FIG. 8;

FIG. 8 is a rear view of the control apparatus shown in FIG. 7, certain parts being shown as broken away or removed for the sake of clarity in the drawings;

FIG. 9 is a cross sectional view taken generally along the line 9—9 in FIG. 8;

FIG. 10 is a combined hydraulic and electrical circuit diagram for use with the present invention; and FIG. 11 is a view of a boat showing the present invention incorporated therein.

DESCRIPTION OF A PREFERRED EMBODIMENT

Figure 5:
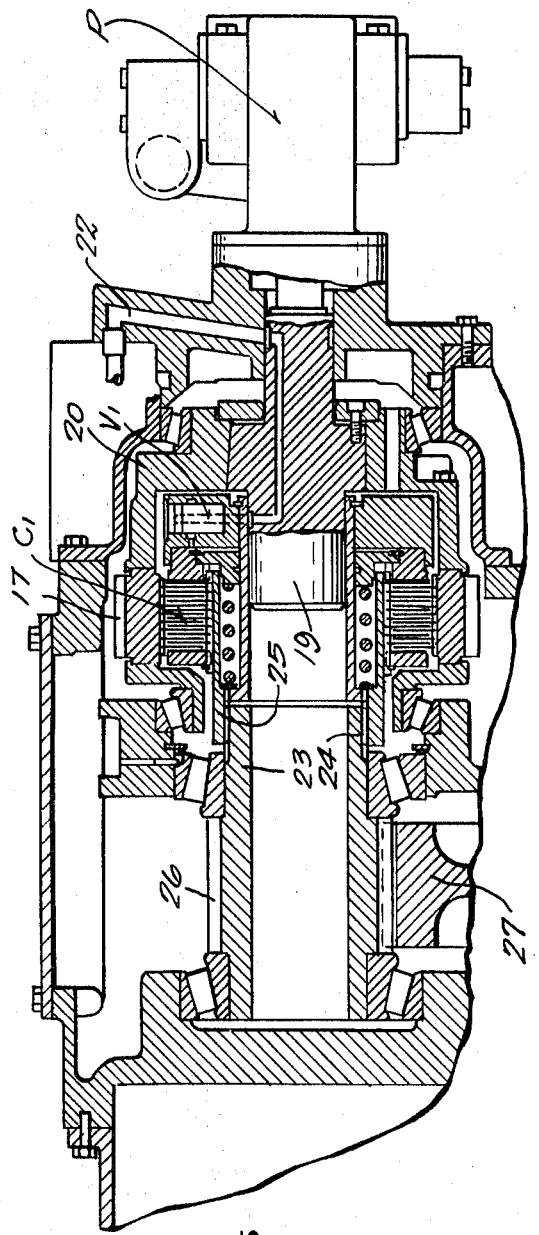
FIG. 5 is a fragmentary, longitudinal, cross sectional view through the reverse shaft assembly, the view being taken generally along the line 5—5 in FIG. 3.

The present invention has been shown as applied to a marine vessel such as a fishing boat B shown in FIG. 11, and it is in this environment that the invention finds particular utility for controlling the propeller shaft S to which the propeller 1 is attached, so that the propeller can be driven at varying speeds in either direction and at the same time, maintain the speed of the prime mover E constant.

Vessel bow thrusters or other propeller equipped steering devices, driven by near constant speed engines, electric or hydrostatic motors would also benefit from the use of this marine transmission.

The transmission T connects the prime mover E to the propeller shaft S and is shown in greater detail in FIGS. 1 to 6 inclusive, and reference will now be made to these figures.

The input to the transmission is from the engine output shaft 2 which drives the input shaft 3 of the transmission. The pinion gear 4 of the shaft 3 is in constant mesh with a gear 5 fixed to the forward shaft 6 of the transmission. The rear end of shaft 6 has an enlarged drum type hub portion 7 fixed thereto. This drum is adapted to be disengageably connected to a sleeve 8 which surrounds shaft 6 and to which sleeve gear 9 is fixed. Thus, the shafts 6 and 8 are disengageably connected by means of a hydraulically actuated, friction type clutch C. The clutch C includes interleaved friction plates which are mounted by conventional spline means to the interior of the drum 7 and to the periphery of the rear end of sleeve 8, respectively, in the known manner. The clutch also includes piston 10 which is axially slideable when the clutch actuating chamber 11 is pressurized to thereby cause axial clamp up of the clutch plates in the known manner and consequent engagement of the clutch. The clutch is of the modulatable type, that is to say, the degree of clutch plate clamp up can be varied to, in turn vary the amount of slipping permitted between the shaft 6 and the sleeve 8 or the clutch can be fully clamped to provide a solid drive therethrough. For the purpose of controlling the amount of pressure admitted to the clutch actuating chamber 11, a centrifugal valve V is provided in the driven portion of clutch C, more specifically in the portion rearward of the actuating chamber 11. Control pressure is admitted to the actuating chamber 11 from a control passage 12 and via the valve V as follows.

Figure 6:
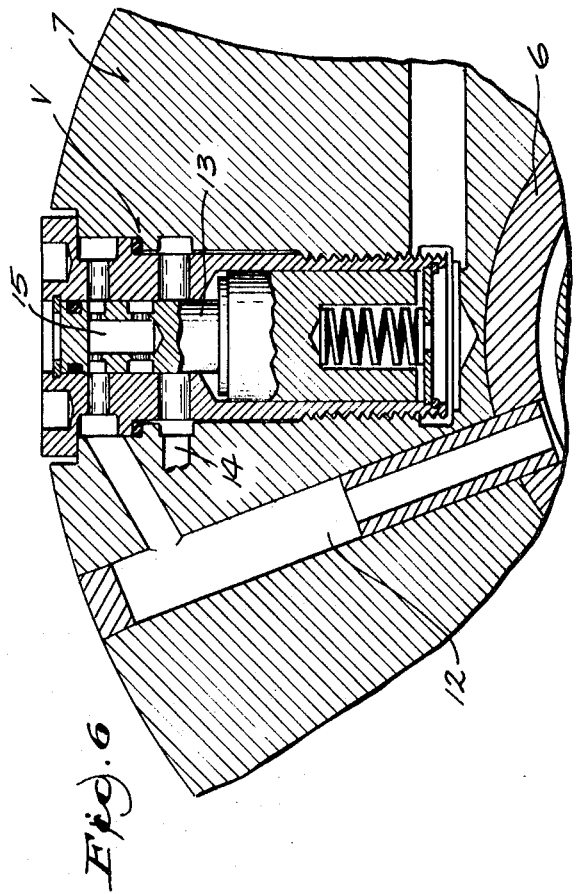
FIG. 6 is an enlarged, fragmentary, cross sectional view taken along line 6—6 in FIG. 1 and showing the centrifugally operated control valve for controlling admission of actuating fluid pressure to the clutch.

Referring more particularly to FIG. 6, the control pressure is introduced through passage 12 and to the radially outer end of a radially shiftable valve element 13 of the valve V. When the shiftable valve element 13 is in the position shown in FIG. 6, pressurized fluid is prevented from entering the actuating chamber 11 through passage 14. However, when the shiftable valve element 13 is shifted radially inwardly, fluid from passage 12 can flow via the central passage 15 in shiftable valve element 13 and through the passage 14 to the clutch actuating chamber 11. As fully described in the said U.S. Pat. No. 3,352,-395, a single control pressure can be utilized to vary the fluid pressure in the clutch actuating chamber 11 by balancing the control pressure which tends to open the valve to permit flow into the clutch cylinder against the spring force and centrifugal force on the valve which tends to cut off this flow. Thereby the degree of modulation of the friction type clutch and the reverse and forward output speeds is varied.

The valve is a part of the output portion of each clutch and is basically an output speed governor. Since the pressurized fluid in the driving clutch is being continually exhausted through normal leakage and also through an orifice which continually bleeds fluid from the pressurized chamber, this pressurized fluid must be continually replenished by the action of this governor valve in order to maintain a drive through this clutch. The pressurized fluid to the driving clutch is balanced by two forces, namely, the centrifugal force resulting from the rotational "weight" of the valve which tends to cut off the flow to the engaging clutch cylinder and the reference pressure which is established at the outer radius of this valve which tends to open the valve and admit pressurized fluid to modulate the engagement of the clutch.

The clutch portion 7 has a gear 16 secured around its periphery and this gear 16 is in constant mesh with the gear 17 of a similar clutch C1 which is fixed to a reverse shaft 19 of the transmission (FIGS. 3 and 5).

It will be noted that the reverse shaft 19 is relatively short and its hub 20 together with the clutch C1 is of similar construction to the drum type hub 7 and clutch C of shaft 6. The clutch C1 is actuated in the same manner as clutch C and for this purpose, pressurized fluid is introduced to a control valve V1 which is similar to the valve V, by means of the fluid inlet passage 22. In other words, the control and operation of clutch C is the same as clutch C1. However, when one of the clutches is engaged, the other is disengaged so that either the forward sleeve 8 is being driven by clutch C, or the reverse, tubular shaft 23 is being driven by clutch C1. Shaft 23 is splined at 24 to the sleeve member 25 of the clutch, and to which sleeve member the inner clutch plates are splined in the known manner. The sleeve shaft 23 has a gear 26 fixed around its periphery for constant engagement with the output gear 27 as will appear.

The output gear 27 is fixed to the output shaft 28 and it will be noted from FIG. 4 that the output gear 27 is in constant mesh with both the gear 9 of the forward shaft 6 and the gear 26 of the reverse sleeve shaft 23. Therefore, depending on whether clutch C or clutch C1 is engaged, the output shaft 28 will be driven in either the forward or reverse direction of rotation.

The output shaft 28 is connected by the coupling 30 to the propeller shaft S and thereby the propeller can be driven in either the forward or reverse directions, depending on which clutch is selected for engagement.

A fluid pump P (FIGS. 5 and 10) is attached to the rear end of the reverse shaft 19 and is driven thereby, and this pump P furnishes the fluid pressure for controlling the actuating of the clutches as above mentioned. In other words, the pump P provides the high pressure supply fluid for clutch actuating and this source of pressure fluid is directed via conduit 33, and then through an electrically operated solenoid valve V2 of the adjustable type. The valve V2 is regulated as to the amount of flow passing therethrough by an operator controlled potentiometer 34 which regulates the amount of electrical current that is admitted to a coil 35 of the electrical control for valve V2. More specifically, the boat operator, by swinging the control lever 36 in one direction or the other, thereby adjusts the potentiometer 34 and consequently, the amount of current being admitted to the coil 35 of the electrical control. Varying the current to the coil 35 in the electrical control thereby regulates the hydraulic clutch actuating fluid pressure, that is to say, it varies the fluid pressure in proportion of the current variations. Thus, the valve V2 is an electrically operated, fluid pressure regulating valve that controls the amount of pressurized fluid being admitted from pump P to either the reverse solenoid valve SVR or the forward solenoid valve SVF (FIG. 10).

The reverse solenoid valve SVR is actuated by the solenoid 37 (FIGS. 8, 9, and 10) while the solenoid 38 actuates the forward solenoid valve SVF. The solenoids 37 and 38 in turn are actuated by their respective switches 39 and 40 (FIGS. 9 and 10). As shown in FIGS. 8 and 9, a cam 42 is secured to the shaft 43 so that when the operator swings the handle 36 in one direction or the other, either the switch 39 or 40 is actuated by the cam to thereby in turn cause their respective solenoids to actuate the solenoid valves SVR or SVF, thus engaging either the reverse or forward clutch.

The clutches can be engaged in any degree due to their modulating action and consequently, the propeller shaft can be driven at various speeds in either direction. Depending upon the amount of control pressure called for by the operator, the output speed of the propeller shaft, in either the forward or reverse directions can be maintained at the pre-selected value.

With the present invention, the speed of the propeller shaft can be controlled independently of prime mover speed and there is no necessity for having a variable pitch propeller. Nevertheless, many of the functions can be duplicated of a variable pitch propeller arrangement. With the present invention, the prime mover speed can be maintained at the desired r.p.m. and changes in thrust conditions for the vessel can be obtained by varying the speed of the propeller shaft.

The propeller speed control characteristics of the above described modulated clutches are such that the propeller r.p.m. will be maintained so long as the prime mover r.p.m. is sufficient. Whenever excess prime mover speed exists in relation to the propeller r.p.m. being used, that prime mover speed can be varied at will, perhaps for the purpose of regulating the speed of deck winches, hydraulic pumps or similar shipboard prime mover driven devices, other than the propeller, which may be powered by a vessel's main propulsion prime mover.

We claim:

1. A power transmission including a forward shaft and a reverse shaft, an output shaft having a driving connection with both the forward and reverse shafts; a hydraulically actuated, friction type clutch having a portion connected to each of said forward and reverse shafts, said clutches also each having a second portion, gear means connecting said second portions with said output shaft, a source of pressurized fluid connected to and for actuating said clutches, a control valve connected with each of said clutches at the output side thereof for controlling the amount of pressurized fluid from said source and which is admitted to each of their respective hydraulically actuated clutch to thereby modulate the engagement of said clutches, and control means including passages for selectively directing pressurized fluid admitted to either of said control valves to thereby actuate either of said clutches and rotate said output shaft in one direction or the other.

2. The transmission described in claim 1 further characterized in that said control means includes a solenoid operated valve for directing fluid pressure through said passages to either of said clutches via their respective control valves, means for conducting electric current from a power source to said control means, and an electrically operated, fluid pressure regulating valve connected to said solenoid valves for admitting fluid pressure thereto.

3. The transmission described in claim 2 further characterized in that said control means includes a manually adjustable means for regulating the amount of current to said electrically operated, fluid pressure regulating valve.

4. A power transmission including a forward shaft and a reverse shaft, an output shaft, a constant mesh gear and sleeve connection between said output shaft and each of the forward and reverse shafts; said forward, reverse and output shafts being mounted in parallelism; a hydraulically actuated, friction type clutch for each of said forward and reverse shafts, said clutches each having a gear portion in constant mesh with each other, said clutches being disengageably connected with said gear and sleeve connection of their respective shaft, a source of pressurized fluid connected to and for actuating said clutches, a fluid pressure control valve connected with each of said clutches for controlling the amount of pressurized fluid admitted to their respective clutch to thereby modulate the engagement of said clutches, and control means including passages for selectively controlling the pressurized fluid admitted to either of said control valves to thereby actuate either of said clutches and rotate said output shaft in one direction or the other and at various predetermined speeds.

5. The transmission as described in claim 4 further characterized in that said control means includes a solenoid operated valve for directing fluid pressure through said passages to either of said clutches via their respective control valves, means for conducting electric current from a power source to said control means, and an electrically operated, fluid pressure regulating valve connected to said solenoid valves for admitting fluid pressure thereto.

6. The transmission described in claim 5 further characterized in that said control means includes a manually adjustable means for regulating the amount of current to said electrically operated, fluid pressure regulating valve.

7. In combination with a marine vessel having a propeller shaft and a power transmission comprising; a forward shaft and a reverse shaft, an output shaft having a driving connection with both the forward and reverse shafts and also connected to said propeller shaft for rotating the latter in either direction, a hydraulically actuated friction type clutch having a portion connected to each of said forward and reverse shafts, said clutches also each having a second portion, gear means connecting said second portions with said output shaft, a source of pressurized fluid connected to and for actuating said clutches, a fluid pressure control valve connected with each of said clutches for controlling the amount of pressurized fluid from said source and which is admitted to each of their respective clutch to thereby modulate the engagement of said clutches, and control means including passages for selectively controlling the pressurized fluid admitted to either of said control valves to thereby actuate either of said clutches and rotate said output shaft and said propeller shaft in one direction or the other at a selected propeller shaft r.p.m.

8. The transmission as described in claim 7 further characterized in that said control means includes a solenoid operated valve for directing fluid pressure through said passages to either of said clutches via their respective control valves, means for conducting electric current from a power source to said control means, and an electrically operated, fluid pressure regulating valve connected to said solenoid valves for admitting fluid pressure thereto.

9. The transmission described in claim 8 further characterized in that said control means includes a manually adjustable means for regulating the amount of current to said electrically operated, fluid pressure regulating valve.

10. In combination with a marine vessel having a propeller shaft and a prime mover, a transmission comprising; a forward shaft and a reverse shaft, an output shaft, a constant mesh gear and sleeve connection between said output shaft and each of the forward and reverse shafts and also connected to said propeller shaft for rotating the latter in either direction, said forward, reverse and output shafts being mounted in parallelism; a hydraulically actuated, friction type clutch for each of said forward and reverse shafts, said clutches each having a gear portion in constant mesh with each other, said clutches being disengageably connected with said gear and sleeve connection of their respective shaft, a source of pressurized fluid connected to and for actuating said clutches, a fluid pressure control valve connected with each of said clutches for controlling the amount of pressurized fluid admitted to their respective clutch to thereby modulate the engagement of said clutches, and control means including passages for selectively controlling the pressurized fluid admitted to either of said control valves to thereby actuate either of said clutches and rotate said output shaft and said propeller shaft in one direction or the other and at various predetermined speeds.

11. The transmission as described in claim 10 further characterized in that said control means includes a solenoid operated valve for directing fluid pressure through said passages to either of said clutches via their respective control valves, means for conducting electric current from a power source to said control means, and an electrically operated, fluid pressure regulating valve connected to said solenoid valves for admitting fluid pressure thereto.

12. The transmission described in claim 11 further characterized in that said control means includes a manually adjustable means for regulating the amount of current to said electrically operated, fluid pressure regulating valve.

13. A hydraulically actuated friction clutch type power transmission including a forward shaft and a reverse shaft, an output shaft, a constant mesh gear and sleeve connection between said output shaft and each of said forward and reverse shafts; a hydraulically actuated, friction type clutch for each of said forward and reverse shafts; a source of pressurized fluid connected to and for actuating said clutches, a fluid pressure, centrifugally sensitive control valve connected with each of said clutches at the output side thereof for controlling the amount of pressurized fluid admitted to their respective hydraulically actuated clutch to thereby modulate the engagement of said clutches and maintain the input speed of the clutches at a constant predetermined speed which can be varied, and control means including passages for selectively controlling the pressurized fluid admitted to either of said control valves to thereby actuate either of said clutches and rotate said output shaft in one direction or the other.

14. The transmission as described in claim 13 further characterized in that said control means includes a solenoid operated valve for controlling fluid pressure through said passages to each of said clutches via their respective control valves, means for conducting electric current from a power source to said control means, and an electrically operated, fluid pressure regulating valve connected to said solenoid valves for admitting fluid pressure thereto.

15. The transmission described in claim 14 further characterized in that said control means includes a manually adjustable means for regulating the amount of current to said electrically operated, fluid pressure regulating valve.

References Cited

UNITED STATES PATENTS

| | | | |
|---|---|---|---|
| 2,729,981 | 1/1956 | Budzien | 74—361 |
| 3,352,395 | 11/1967 | Hilpert | 192—103 (Fi) |
| 3,448,640 | 6/1969 | Nelson | 74—866 |
| 2,648,990 | 8/1953 | Hindmarch | 74—361 |
| 3,465,609 | 8/1969 | Fisher et al. | 74—360 |
| 3,348,643 | 10/1967 | Townsend | 74—364 X |
| 3,433,101 | 3/1969 | Scholl et al. | 74—866 |
| 2,851,895 | 9/1958 | Aschauer | 74—361 |

ARTHUR T. McKEON, Primary Examiner

U.S. Cl. X.R.

74—364